INVENTOR:
JOSEF BECKER

United States Patent Office
3,452,703
Patented July 1, 1969

3,452,703
TRANSMISSION FOR PROPULSION SYSTEMS OF WATERCRAFT
Josef Becker, Oberspay (Rhine), Germany, assignor to Schottel-Werft Josef Becker KG., Oberspay (Rhine), Germany
Filed Mar. 27, 1967, Ser. No. 626,231
Claims priority, application Germany, Dec. 7, 1966, Sch 39,932
Int. Cl. B63h 25/42, 5/06, 1/14
U.S. Cl. 115—35            13 Claims

ABSTRACT OF THE DISCLOSURE

The lower section of the transmission casing in the propulsion system of a watercraft is turnable about a vertical axis. The connection between the lower and the upper sections of the casing includes a gear which is rigid with the lower section and is mounted in radial and thrust bearings provided in the upper section. At least the thrust bearings are plain bearings each of which may comprise a singe ring or two so-called leveling plates which permit for some swiveling of the lower section. The clutch which transmits torque to the propeller shaft in the lower section of the casing can be placed coaxially with or at right angles to the axis about which the lower sections turns with reference to the upper section, and the aforementioned gear forms part of a turning unit which serves to change the angular position of the lower section and to thereby alter the course of the craft.

Background of the invention

My present invention relates to watercraft in general, and more particularly to improvements in transmissions for propulsion systems of watercraft. Still more particularly, the invention relates to transmissions which may be utilized to drive propellers for watercraft of the type wherein the propeller also serves to change the course of watercraft by being turnable about a substantially vertical axis.

Watercraft which can change course in response to turning of their propellers about a vertical axis are known. As a rule, the transmission casing of the power train which transmits motion from the power plant to the propeller shaft comprises a lower section which carries the propeller shaft, and such lower section is turnable with reference to the upper section to change the position of the propeller shaft in a plane which is substantially parallel to the plane of the water surface. Such types of propulsion systems are practical in amphibian vehicles as well as in watercraft which are intended for use in shallow waters, especially if the transmission casing is movable up and down so that the propeller may assume a series of vertically spaced positions. During travel on land, the operator of the amphibian vehicle will move the propeller to its uppermost position. The same procedure is followed when a craft embodying a vertically movable transmission is used in shallow waters.

A serious drawback of presently known propulsion systems for turnable and vertically reciprocable propellers is that they occupy too much room, that their transmissions are very costly, and/or that the construction of their transmission casing is too weak, mainly because the turnable section of the transmission casing is mounted on ball or roller bearings. Furthermore, such propulsion systems are often quite noisy, the wear on their parts is very high, and they cause excessive vibration of the watercraft.

It is an important object of my present invention to provide a compact, rugged and simple transmission which may be utilized in watercraft or amphibian vehicles of the type wherein the propeller is turnable about an axis which is normal or substantially normal to the water surface.

Another object of the invention is to provide a novel and improved transmission casing which may be used in a transmission of the just outlined characteristics and to construct and assemble the casing in such a way that its lower section which carries the propeller shaft is rotatably connected with the upper section of the casing in a novel way to insure that the angular position of the propeller shaft can be changed by resorting to a small and inexpensive prime mover.

A further object of the invention is to provide a transmission casing which extends only little above the water, whose dimensions are small in directions at right angles to as well as in parallelism with the water surface, and wherein the operation of parts which transmit torque to the propeller shaft is not affected by turnability of the propeller shaft in a horizontal plane for the purpose of changing the course of the craft.

Summary of the invention

Briefly outlined, one feature of my present invention resides in the provision of a transmission which is embodied in a propulsion system for barges, lighters, pleasure boats, amphibian vehicles and analogous craft. The transmission comprises a casing having an upper section which may but need not be fixedly mounted in the hull of a watercraft and a lower section which is turnable with reference to the upper section about a substantially vertical axis, a substantially horizontal propeller shaft journalled in the lower section, a power train provided in the casing and having a rotary input member provided in the upper section and a rotary output member arranged to receive torque from the input member and to thereby rotate the propeller shaft, and novel connecting means joining the lower section to the upper section for rotation about the aforementioned vertical axis. The connecting means comprises an annular member which is coaxially secured to one of the sections and is turnable about the vertical axis in friction reducing means provided therefor in the other section. Such friction reducing means comprises at least one radial bearing and at least one plain thrust bearing, i.e., a thrust bearing which does not utilize balls, rollers or analogous rolling elements but preferably comprises one or more solid rings which are interposed between the annular member and the other section.

In accordance with a presently preferred embodiment of my invention, the annular member is rigid with the lower section of the transmission casing and is rotatable between an upper and a lower plain thrust bearing provided in the upper section. The annular member can form part of the turning unit which causes the lower section to turn about the vertical axis, and such turning unit preferably comprises a motor which is mounted on the upper section and a motion transmitting device which can rotate the annular member in a clockwise or in a counterclockwise direction.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

Description of the preferred embodiments

Figure 1:
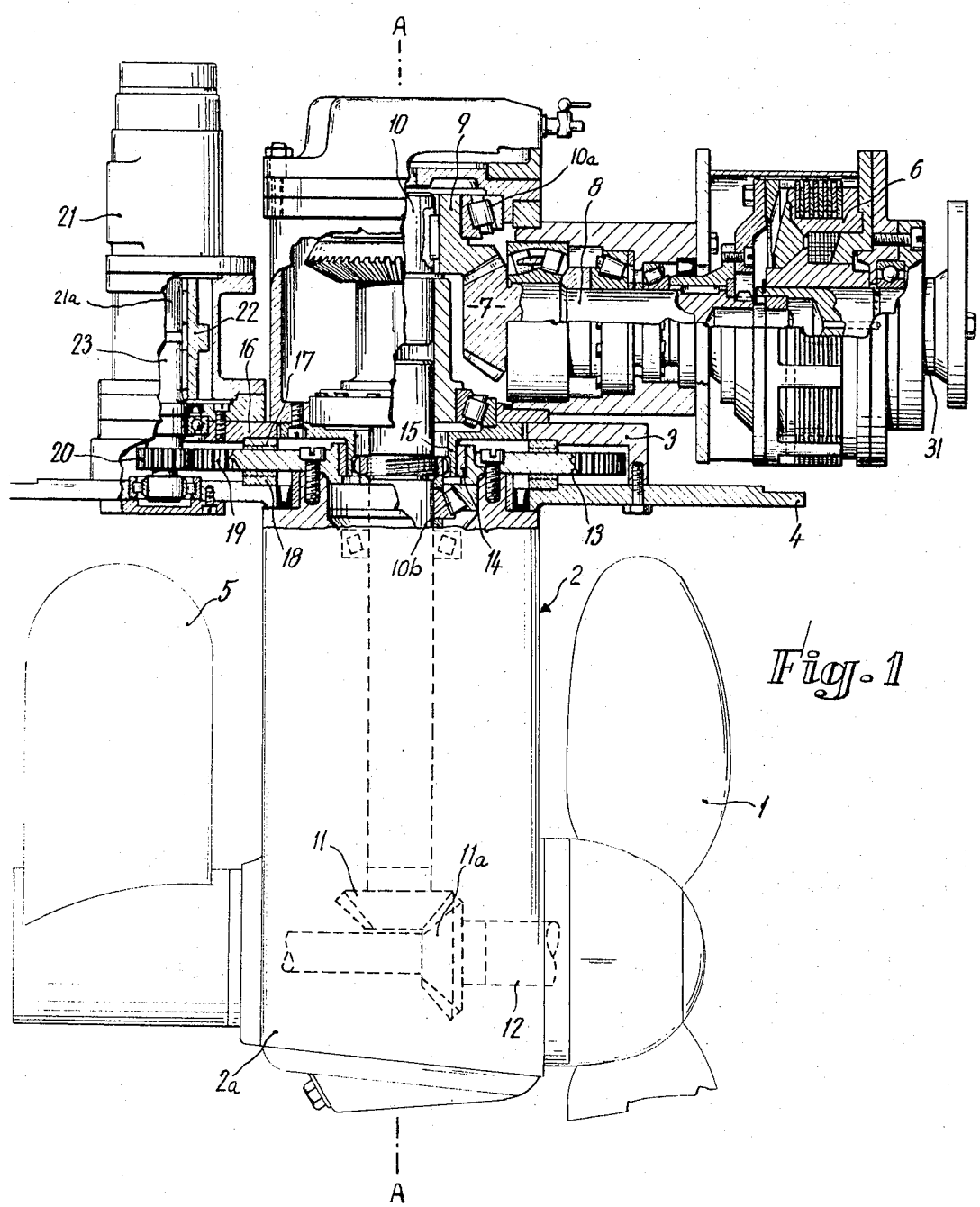
FIG. 1 is a partly elevational and partly vertical sectional view of a transmission which embodies one form of my invention.

Referring first to FIG. 1, there is shown a transmission which can be built directly into the hull of a watercraft or into the housing of a transferable propulsion system. The shaft 12 of a propeller 1 is rotatable in the lower portion or mound 2a of a transmission casing which includes an upper section 3 and a lower section 2. The mount 2a is integral with the lower section 2 and is turnable therewith about a vertical axis A—A so that the propeller 1 may be used to steer the watercraft. The mount 2a is provided with a skeg 5. The upper section 3 of the transmission casing may be rigidly installed in the hull or is movable with the lower section 2 up and down in a manner and for the purposes as disclosed in the aforementioned application of Becker et al. If the transmission of my invention is permanently installed in the hull of a watercraft, the plate-like annular portion or member 4 of the upper section 3 can be sealingly secured to a raised portion of the bottom wall at the stern of the hull so that the lower section 2 extends through and downwardly beyond the bottom wall.

The prime mover of the power train which drives the propeller shaft 12 is not shown in the drawings. Such prime mover may be constituted by an electric motor, a hydraulic motor or an internal combustion engine and is drivingly connected with a horizontal input shaft 31 which transmits torque to a vertical output shaft 10. The axis of the shaft 10 coincides with the vertical axis A—A and its lower end carries a bevel gear 11 meshing with a bevel gear 11a on the propeller shaft 12. The upper end portion of the output shaft 10 carries a further bevel gear 9 which meshes with a bevel gear 7 mounted on an intermediate shaft 8 which is coaxial with the input shaft 31. The power train further includes a preferably electromagnetic clutch 6 which can be engaged and disengaged by remote control. The construction of the clutch 6 is preferably such that it normally transmits torque to the intermediate shaft 8 so that the propeller 1 can be driven even if the remote-control operating means for the clutch 6 happens to be out of order, for example, due to lack of pressure fluid or electrical energy. This feature is of particular importance in amphibian vehicles. In the illustrated embodiment, the clutch 6 is a so-called electromagnetic disc clutch.

The output shaft 10 is rotatable in the upper and lower sections of the transmission casing and is installed in antifriction roller bearings 10a, 10b as well as in additional bearings which are not specifically shown in FIG. 1.

The connecting means which secures the lower section 2 to the upper section 3 in such a way that the former is turnable about the vertical axis A—A includes an annular or disc-shaped member 13 (hereinafter called gear for short) which is rigidly bolted to the upper end portion of the lower section 2. The gear 13 is received with clearance between the annular portion or annular member 4 and a further annular portion or annular member 16 of the upper section 3 and is mounted for rotation about a plain radial antifriction bearing or sleeve bearing 14. Two plain axial or thrust bearings 17, 18 are respectively disposed between the annular portions 16, 4 and the gear 13 so that the latter can turn with a minimum of friction when the person operating the watercraft wishes to change course. The gear 13 has a central bore for the output shaft 10 and is provided with an annulus of teeth 19. The aforementioned radial bearing 14 is installed between a collar 15 of the upper annular portion 16 and the cylindrical internal surface of the gear 13. Preferred constructions of the thrust bearings 17 and 18 will be described in connection with FIGS. 3 and 4.

In accordance with a feature of my invention, the gear 13 forms part of a turning unit which can be operated by remote control and serves to steer the watercraft by turning the lower section 2, its mount 2a and the propeller 1 about the vertical axis A—A. The turning unit further includes a prime mover 21, preferably a reversible electric motor which can be started and operated by remote control and is mounted on the upper annular portion 16 of the upper section 3. The output shaft 21a of the motor 21 can drive a vertical shaft 23 in response to engagement of a suitable clutch 22. The shaft 23 carries a pinion 20 which is located in the space between the annular portions 16, 4 of the upper section 3 and whose teeth mesh with the teeth 19 of the gear 13. The motion transmitting assembly 20, 23 can be driven in two directions, started and/or arrested in response to proper manipulation of controls for the motor 21 and clutch 22.

It was found that the exact location of the bevel gear 7 with reference to certain other parts of the transmission is of considerable importance. In accordance with a presently preferred embodiment of my invention, the gear 13 is located at a level below and the bevel gear 9 is located at a level above the bevel gear 7. This brings about a considerable reduction in the overall height of the transmission.

When the person in charge wishes to propel the watercraft in water, the prime mover for the transmission is started to rotate the input shaft 31. The operator need not operate the clutch 6 because the latter is preferably constructed in such a way that it normally transmits torque from the input shaft 31 to the intermediate shaft 8. The shaft 8 drives the output shaft 10 and the latter drives the propeller shaft 12. In order to change course, the person in charge will operate the controls of the motor 21 and clutch 22. If the propeller shaft 12 is to be arrested without stopping the prime mover for the input shaft 31, the operator will simply disengage the clutch 6.

Figure 2:
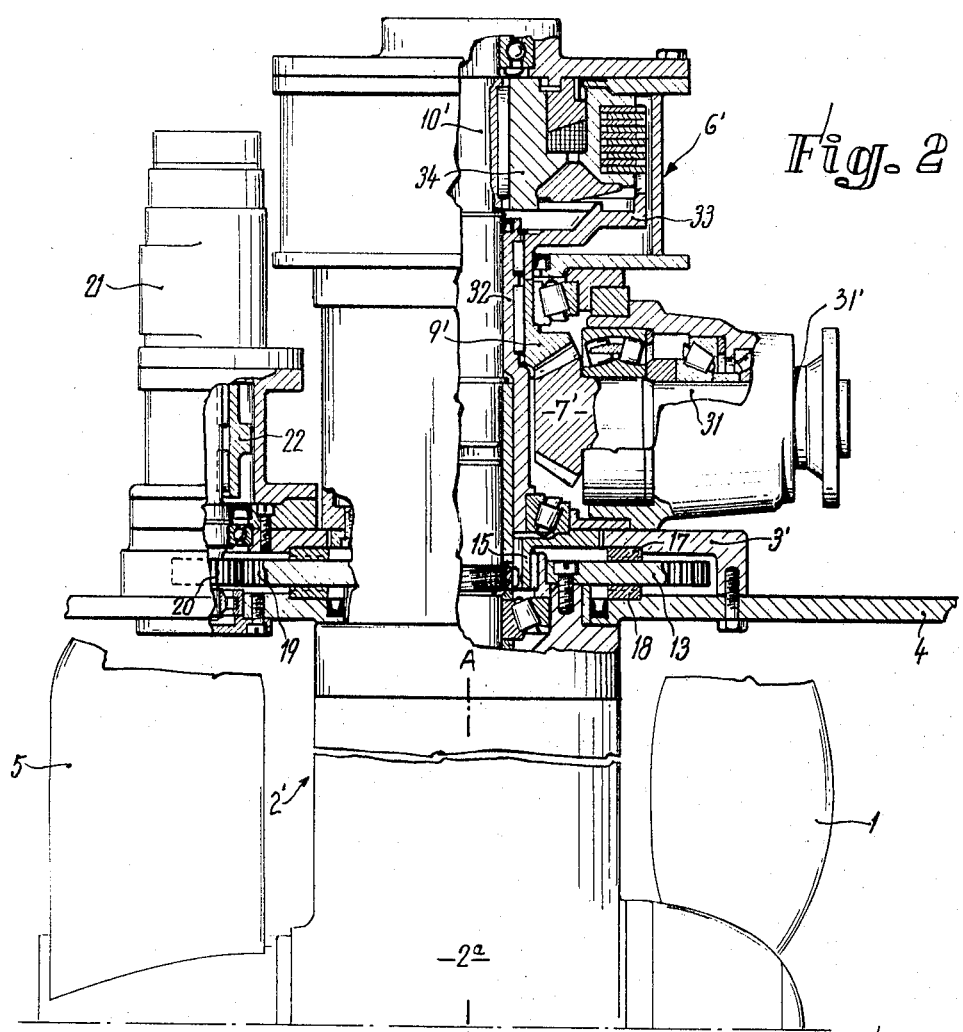
FIG. 2 is a partly elevational and partly vertical sectional view of a modified transmission wherein the clutch is coaxial with the lower section of the transmission casing.

FIG. 2 illustrates a modified transmission which comprises a different casing including an upper section 3' and a lower section 2'. The manner in which the output shaft 10' of the power train can drive the shaft of the propeller 1 is the same as described in connection with FIG. 1. The gear 13 is mounted in friction reducing means including two axial or thrust bearings and a radial bearing whose construction may be the same as that of bearings 17, 18, 14 shown in FIG. 1. The turning unit (motor 21) is also identical with the turning unit of FIG. 1.

In this embodiment of my invention, the upper section 3' is higher than the upper section 3 of FIG. 1 but occupies less space as seen in a direction radially of the vertical axis A—A. The input shaft 31' is rigid with the bevel gear 7' and the latter meshes with a bevel gear 9' which is freely rotatable on the upper end portion of the output shaft 10'. The clutch 6 of FIG. 1 is replaced by a clutch 6' whose clutching elements 33, 34 are respectively rigid with the bevel gear 9' and output shaft 10'. The connection between the element 33 and bevel gear 9' comprises a hollow cylindrical shaft 32 which is rotatable on the output shaft 10'. The clutch 6' is an electromagnetic disk clutch and its laminae can transmit torque from the clutching element 33 to the clutching element 34 when the clutch is on. It will be seen that the clutch 6 of FIG. 1 is coaxial with the input shaft 31 and bevel gear 7, and that the clutch 6' of FIG. 2 is coaxial with the bevel gear 9' and output shaft 10'. This accounts for differences in height of the upper casing sections 3 and 3'. The manner in which a prime mover can drive the input shaft 31' (for example, through the intermediary of a Cardanic shaft or a belt drive) forms no part of the present invention.

As stated before, the electromagnetic clutches 6 and 6' constitute but two of a variety of clutches which can be utilized in the transmission of my present invention. For example, the clutch 6 or 6' may be replaced by a simple disk clutch wherein a package of springs or other suitable biasing means normally establishes a driving connection between the shafts 31, 8 or 32, 10'. If the person in charge wishes to disengage the clutch, he must cause the springs to permit disengagement of cooperating laminae, for example, by connecting the clutch to a source of electrical energy or to a source of hydraulic pressure fluid. Such construction of the clutch is of advantage when the watercraft is operated in heavy seas because, by being normally engaged, the clutch insures that the boat can be propelled even if energy necessary to disengage the clutch is not available or the operative connection between the source of energy and the clutch is out of order. This can occur in heavy rainstorms when inflowing water causes a short circuit in the electrical wiring.

Whether a designer of propulsion systems for watercraft will choose the transmission of FIG. 1 or 2 will depend on circumstances. For example, if the height of the transmission casing is to be very low but there is more room in a direction radially of the axis A—A, the designer will resort to the solution shown in FIG. 1. On the other hand, if there is little room in the radial direction of the axis A—A but more room above the propeller 1, the design of FIG. 2 will be more practical.

Figure 3:
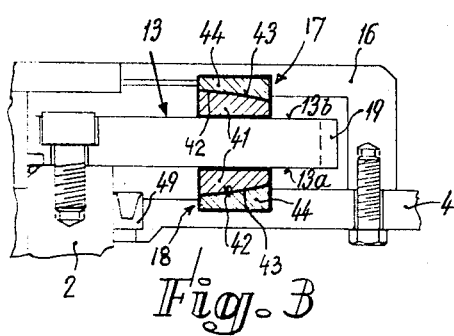
FIG. 3 is an enlarged fragmentary axial sectional view of the connecting means between the sections of the casing in a third transmission.

FIG. 3 shows the construction of two thrust bearings which can be used in the transmission of FIG. 1 or 2. It is now assumed that these are the thrust bearings 17, 18 of FIG. 1. The gear 13 is received with clearance between the annular portions 16, 4 of the upper casing section 3 and is bolted to the lower section 2. Each of the bearings 17, 18 is a so-called plain thrust bearing (i.e., it does not utilize balls, rollers or analogous rolling elements) and is of the type which permits for automatic truing of the lower section 2. To this end, each of the bearings 17, 18 comprises two so-called leveling plates 41, 44. Each plate 41 is affixed to the gear 13 and each plate 44 is affixed to one of the annular portions 16, 4. It will be noted that the bearings 17, 18 are disposed at the opposite sides of the gear 13 and are adjacent to the radially outermost portions of the respective end surfaces 13b, 13a. Each plate 41 has a convex surface 42 and each plate 44 has a complementary concave 43. The radii of curvature of the surfaces 42, 43 are identical and the centers of curvature of these surfaces are located on the axis A—A, i.e., on the axis of the output shaft 10. If the plates 41 are relatively small, they may form parts of a single sphere, i.e., their surfaces 42 can have a common center of curvature. The plates 44 are preferably recessed into the annular portions 16 and 4. The thrust bearings 17, 18 of FIG. 3 enable the lower section 2 to turn about the vertical axis A—A even if it happens to be slightly out of true, i.e., even if rotation of the section 2 by the motor 21 will cause some wobbling of the gear 13.

Figure 4:
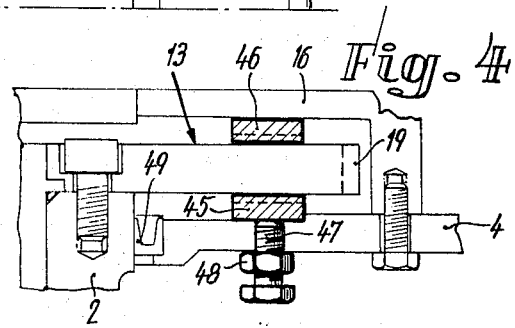
FIG. 4 is a similar fragmentary axial sectional view of modified connecting means.

Referring finally to FIG. 4, there is shown a different mode of mounting the gear 13 between the annular portions 16 and 4 of the upper section 3. The two-piece axial bearings 17, 18 of FIG. 3 are replaced by two one-piece rings 45, 46 each of which can be affixed to one of the annular portions 4, 16 and provides a smooth guide surface for the respective end surface of the gear 13. In addition, the structure of FIG. 4 also comprises adjusting or truing means for the lower antifriction bearing ring 45. Such adjusting means comprises one, two or more bolts 47 which mesh with the annular portion 4 and whose tips can change the inclination of the ring 45 with reference to the axis A—A. Lock nuts 48 are applied once the person in charge has placed the ring 45 into desired position. The adjusting means 47–48 can be replaced by other types of adjusting means, for example, by wedges which can be driven between the ring 45 or 46 and the respective annular portion 4, 16 to change the inclination of such rings with reference to the gear 13. It is further clear that the structure of FIG. 3 may also comprise adjusting means, either for one or both leveling plates 44, and that each such adjusting means may comprise a group of bolts 47 or analogous truing devices.

The numerial 49 denotes in FIGS. 3 and 4 a suitable gasket which prevents leakage of water between the peripheral surface of the lower section 2 and the annular portion 4. The exact nature of this gasket forms no part of my invention.

In heretofore known transmissions for propellers which serve to propel and to steer the watercraft in water, the lower section of the transmission casing is normally mounted in ball thrust bearings or in ball bearings which can take up radial and axial loads. It was found that such bearings cannot take up tilting forces which are developed by the propeller and that such bearings cannot produce any (or produce only negligible) damping action. In other words, vibrations produced by the propeller are propagated to the upper section of the transmission casing and to the hull. It was also found that, even if the balls of such conventional bearings consist of extra hard or hardened material, and even if such balls are guided in V-shaped grooves, they undergo substantial elastic or even permanent deformation and cause the lower section of the transmission casing to wobble with reference to the upper section. Vibrations must be damped by special shock absorbers, usually by packages of rubber disks or rings which are interposed between the hull and the transmission casing. The life expectancy of such shock absorbers is very short.

The above outlined drawbacks of conventional transmissions are overcome by the utilization of plain radial and/or thrust bearings, particularly by the use of plain (roller- or ball-free) thrust bearings of the type shown in FIGS. 3 and 4. Such thrust bearings are better suited to take up considerable tilting stresses and their damping action is much more satisfactory than that of ball or roller bearings.

What is claimed as new and desired to be protected by Letters Patent is set forth in the appended claims.

I claim:

1. In a propulsion system for watercraft, a combination comprising a transmission casing having an upper section and a lower section projecting with a major portion of its length downwardly beyond the bottom end of said upper section and being turnable with reference to the latter about a substantially vertical axis; a substantially horizontal propeller shaft journaled in said lower section; a power train provided in said casing and having a rotary input member and an output member arranged to receive torque from said input member and to thereby rotate said propeller shaft; and connecting means joining in the region of the bottom of the watercraft the bottom end of said upper section to the top end of said lower section for rotation about said vertical axis, said connecting means comprising a disc-shaped member coaxially secured to said top end of said lower section, two rigidly interconnected annular members respectively disposed at opposite sides of said disc-shaped member and fixed to said bottom end of said upper section, and a pair of plain thrust bearings respectively located between said disc-shaped member and said annular members, each of said thrust bearings comprising at least one ring secured to a respective one of said members.

2. A combination as defined in claim 1, and including radial bearing means for said disc-shaped member.

3. A combination as defined in claim 2, wherein said radial bearing means comprises a plain radial bearing.

4. A combination as defined in claim 1, wherein each of said thrust bearings comprises a first ring on said disc-shaped member and a second ring rigid with the respective annular member, and adjusting means for changing the inclination of the axis of at least one of said second rings with reference to said vertical axis.

5. A combination as defined in claim 4 further comprising means for turning said lower section about said vertical axis, said turning means including said disc-shaped member.

6. A combination as defined in claim 5, wherein said turning means further comprises a prime mover carried by said upper section and motion transmitting means driven by said prime mover and arranged to transmit torque to said disc-shaped member.

7. A combination as defined in claim 6, wherein said prime mover includes a reversible motor having a shaft and said motion transmitting means includes a clutch interposed between said disc-shaped member and said shaft.

8. A combination as defined in claim 6, wherein said prime mover includes a reversible motor and said motion transmitting means includes a shaft arranged to be driven by said motor and a pinion carried by said shaft, said disc-shaped member having an annulus of teeth meshing with the teeth of said pinion.

9. A combination as defined in claim 4, wherein said power train further comprises a clutch interposed between said imput and output members, said clutch having cooperating clutch elements rotatable about a common axis which coincides with said vertical axis.

10. A combination as defined in claim 4, wherein said power train includes a normally engaged clutch.

11. A combination as defined in claim 4, wherein said input member is inclined with reference to said vertical axis and said power train further comprises a clutch interposed between said input and output members coaxially with said input member.

12. A combination as defined in claim 1, wherein said power train further comprises a first bevel gear coaxial with said input member and a second bevel gear meshing with said first bevel gear and rotatable about said vertical axis, said disc-shaped member being disposed at a level below the level of said second bevel gear and said first bevel gear being disposed between said levels.

13. A combination as defined in claim 1, and including adjusting means for facilitating truing of said thrust bearings.

References Cited

UNITED STATES PATENTS

| | | | |
|---|---|---|---|
| 213,310 | 3/1879 | Yeo | 308—162 |
| 1,158,424 | 11/1915 | Banner | 308—161 |
| 1,491,992 | 4/1924 | McCuen | 308—161 |
| 1,943,288 | 1/1934 | Chandler et al. | 115—34 X |
| 1,958,997 | 5/1934 | Harrison | 115—35 |
| 2,737,145 | 3/1956 | Gentile | 115—34 |
| 2,749,776 | 6/1956 | Fischer et al. | 115—34 X |
| 2,885,990 | 5/1959 | Hawthorne | 115—35 |
| 3,094,967 | 6/1963 | Willis | 115—35 |
| 3,368,517 | 2/1968 | MacDonald | 115—41 |

TRYGVE M. BLIX, *Primary Examiner.*